Figure 1:
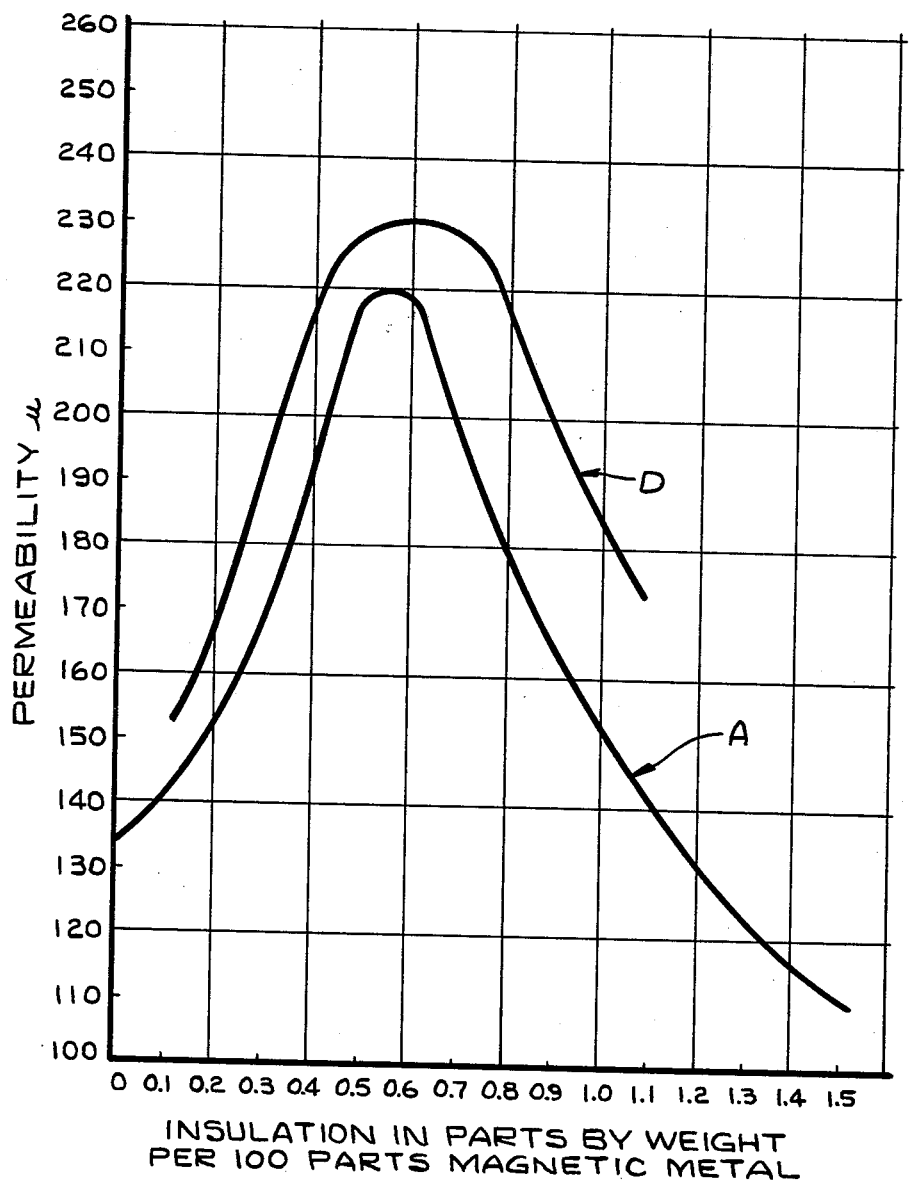

United States Patent Office 3,132,952
Patented May 12, 1964

3,132,952
CERAMIC COMPOSITION COMPRISING AN ALKALI METAL SILICATE, OIL VAPOR, AND AN ALKALI METAL ALUMINATE
Alfred Harendza-Harinxma, Chicago, Ill., assignor to Western Electric Company, Incorporated, New York, N.Y., a corporation of New York
Original application Dec. 3, 1959, Ser. No. 857,087, now Patent No. 3,014,825, dated Dec. 26, 1961. Divided and this application Feb. 27, 1961, Ser. No. 105,836
2 Claims. (Cl. 106—46)

The present invention relates generally to certain new and useful compositions of matter consisting essentially of the heat-treated, ceramic-type reaction product of an alkali metal silicate, oil vapor, and an alkali metal aluminate. More particularly, the invention concerns certain novel compositions of this type, which are highly useful as insulating materials for magnetic cores made in accordance with the general principles of A. F. Bandur Patent 2,105,070, dated January 11, 1938, so as to improve the physical and magnetic properties of the cores. The cores may be used for many purposes, but are designed primarily for use in voice frequency telephone circuits. This application is a division of my copending application, Serial No. 857,087, filed December 3, 1959, which issued on December 26, 1961, as Patent 3,014,825.

Accordingly, the primary object of the invention is to provide certain new compositions of that character, which are primarily useful as insulating materials for magnetic cores.

More specific objects of the invention are to provide new insulating compositions which will increase the magnetic permeability, decrease the core loss, and increase the physical strength of magnetic cores formed by compressing magnetic particles.

According to the above-noted Bandur patent, magnetic cores are produced by coating finely divided magnetic particles with an insulating composition consisting of a refractory metal silicate, magnesium hydroxide and an alkali metal silicate. The insulated particles are then compressed into a core and the core is fired at a temperature of 1000 to 1300° F. to anneal the magnetic particles and cure the coating.

Another object of the invention is to provide improvements in the insulating materials as generally disclosed in the Bandur patent, which improvements are directed primarily to producing cores having increased permeability, decreased core loss, or improved mechanical strength.

For many reasons, it is desirable to increase the permeability rating of the cores as much as possible to the extent that this can be done without any substantial adverse effect on the core loss. For example, by increasing the permeability of the cores, it is possible to utilize cores which are smaller in size to accomplish a given result, thereby resulting in a saving both in space and in the materials used in the cores. Of particular importance from an economic standpoint, is the saving of nickel used as the predominant constituent of the magnetic particles. In the alternative, the same size core may be wound with fewer turns of wire to obtain the same transformer action.

By decreasing the core loss, the cores function more efficiently to transform voice-frequency alternating currents used in telephone transmission systems. In addition, by decreasing the core loss resultant from using a given amount of insulation, it is possible to utilize cores having a smaller amount of insulation than was heretofore possible to produce cores having higher permeabilities.

With the foregoing and other objects in view, the invention comprehends the heat treated, ceramic-type reaction product of an alkali metal silicate, oil vapor, and an alkali metal silicate as a new composition of matter.

This composition is useful, as described hereinabove, as insulation for magnetic cores. Preferably, the composition is that formed by absorbing the vapor of a light mineral oil into dry sodium silicate, exposing the oil-containing silicate to an aqueous solution of sodium aluminate, and then firing the mixture at a temperature of 1000 to 1300° F.

Figure 2:
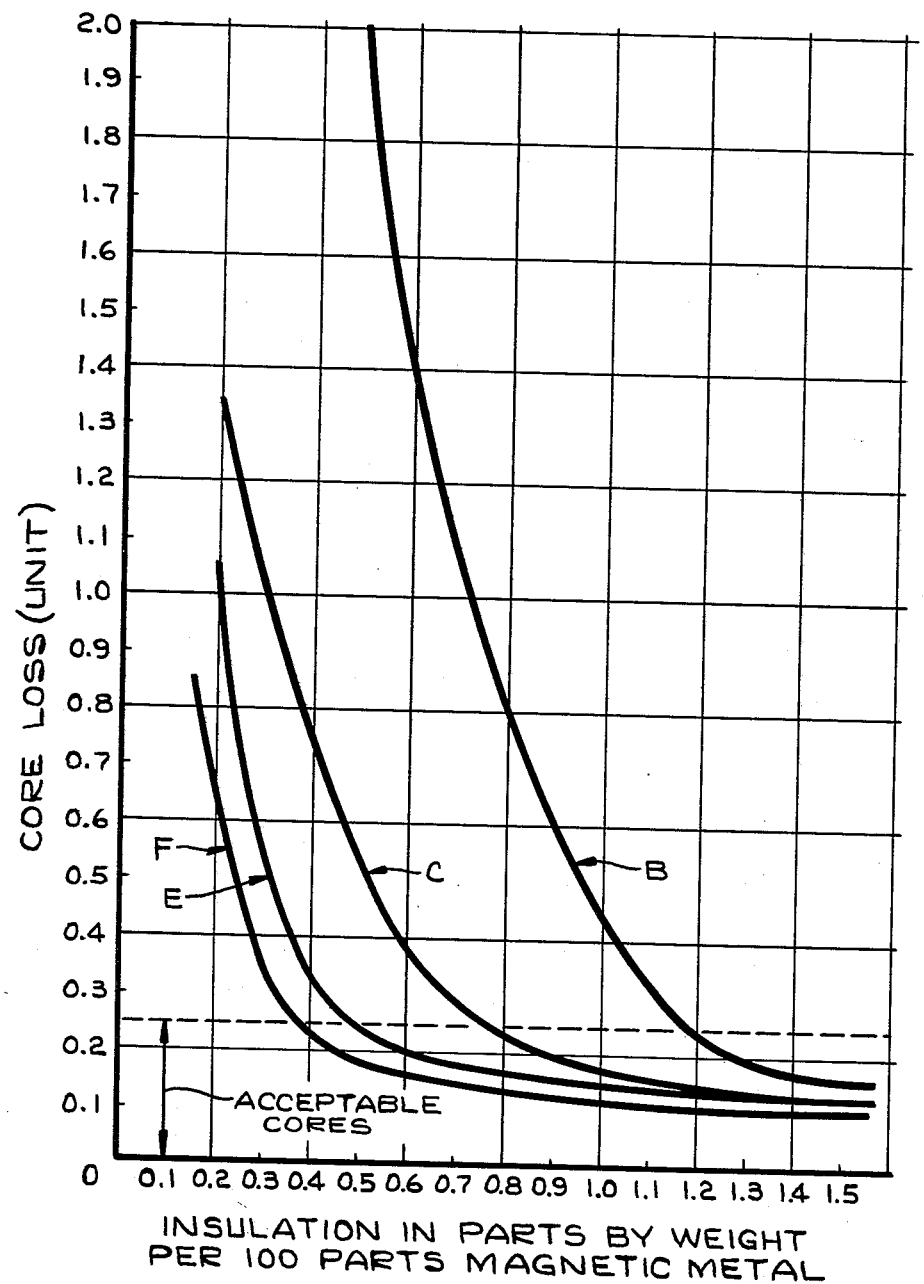

Other objects, advantages and features of the invention will appear from the following detailed description of specific embodiments and examples thereof, when taken in conjunction with the appended drawings, in which:

FIG. 1 illustrates graphically the typical effect of the amount of insulation used on the magnetic permeability at 1800 cycles per second in accordance with the prior process and various of the improved processes of this application; and FIG. 2 illustrates the corresponding effect of the amount of insulation on the core loss at 1800 cycles per second in various cases.

THE PRIOR PROCESS

While various finely divided magnetic particles may be utilized in the practice of the invention, it is preferred to use an embrittled metal alloy selected from the group of nickel and iron alloys known as "Permalloys." Of particular interest is a molybdenum-containing Permalloy consisting essentially of about 82% nickel, 16% iron and 2% molybdeum.

Such an alloy may be treated and comminuted according to the general principles enunciated in C. P. Beath et al. Patent 1,669,649, dated May 15, 1928. According to that patent, the metallic constituents of the alloy are melted together and oxidized in the molten state to embrittle the alloy. This treatment produces a fine crystalline structure in the solidified alloy that facilitates reduction to a fine powder by conventional grinding and pulverizing techniques.

The resultant magnetic powder is sieved through a 120 mesh screen, and any oversize particles are recycled. The majority of the particles are in the range of about 200 to 300 mesh. The sieved powder is next subjected to an annealing heat treatment at about 1500 to 1600° F. to remove stresses introduced into the magnetic material by the grinding operation.

The particles are then given an insulating coating comprising a refractory metal silicate, magnesium hydroxide and an alkali metal silicate. Preferably, the coating is made up of talc (a hydrated magnesium silicate), 1 part by weight; sodium silicate, 0.3 to 0.4 part by weight; and magnesium hydroxide, 0.06 to 0.08 part by weight. The optimum proportions embodied in the commercial process are talc, 1 part by weight; sodium silicate, 0.35 part by weight; and magnesium hydroxide, 0.07 part by weight. The sodium silicate should have a high silicate to soda ratio, preferably about 1.6 to 3.0 parts silicate to one part soda. Other refractory metal silicates, such as aluminum silicate, may be used as well as other alkali metal silicates, such as potassium silicate.

The coating composition is preferably applied in at least three stages from an aqueous suspension of the constituents, followed by heating to dryness at a temperature of about 270 to 300° F. after each stage as is described more fully in the Bandur patent.

After the particles have been insulated, they are compressed into a core of a suitable shape, such as a ring, by molding at a pressure in the neighborhood of 150,000 to 200,000 pounds per square inch. During the application of this pressure, the magnetic particles are again subjected to stresses which impair the magnetic properties thereof. Therefore, the cores are again subjected to an annealing heat treatment by firing at a temperature between about 1000 and 1300° F. The cores are preferably fired in a hydrogen-containing atmosphere at about 1200° F. During this heat treatment, the insulating material is fully cured.

According to the commercial embodiment of the above-described process, core rings are produced having an insulating coating as described above containing about 1.25 parts by weight of the insulating material to 100 parts by weight of the magnetic powder. Such core rings have been found to exhibit an average magnetic permeability at 1800 cycles per second of 125 and an average core loss at 1800 cycles per second of 0.190 unit (ohms per unit of permeability per unit of inductance). The present manufacturing limits on such core rings have been a permeability of at least 115 and a core loss no higher than 0.240 unit.

ALUMINATE TREATMENT

According to the first embodiment of the invention, disclosed in the parent Patent 3,014,825, magnetic particles containing an insulating coating including an alkali metal silicate, and particularly particles formed generally in accordance with the prior process just described, are impregnated with an alkali metal aluminate after the compression step and before the firing step. With this additional step, the core loss is substantially decreased without any substantial adverse effect on the permeability. Preferably, the pressed cores are dipped for a period of 10 to 60 minutes in a 5 to 10% aqueous solution of sodium aluminate.

While the absolute value of the core loss may vary considerably depending on the process conditions, the core loss is decreased by the aluminate treatment in all cases. The amount of insulation is preferably between about 0.5 and 1.5 parts by weight based on 100 parts by weight of the magnetic powder, and the process comprehends mixtures of lightly and heavily insulated powders. Over a wide range of process conditions, the improved method has been found effective to lower the core loss between about 15 and 80%, with the larger decreases being realized in cases where less insulating material is used and the core loss without treatment is higher. The average permeability of cores treated according to the improved process is not substantially changed, although changes of plus or minus 5 units have been encountered with the decreases tending to occur in cases where more insulating material is used.

The drawings depict the effect of the amount of insulation used on the magnetic properties, permeability and core loss, for a typical batch of materials. It should be understood that the absolute values will vary somewhat depending on the various other process factors (particularly the composition and particle size of the metal, the compression technique, the insulating process, and the firing schedule), but the general relationships indicated in the drawings will remain the same. Curve A in FIG. 1 depicts the magnetic permeability as a function of the amount of insulation when cores are fabricated according to the standard process described hereinbefore, while curve B in FIG. 2 illustrates the core loss according to the conventional process. Curve C in FIG. 2 illustrates the decrease in core loss achieved by the addition of the sodium aluminate treatment to the process, while the permeability resultant with the improved process is approximately the same as that of the conventional process, indicated by curve A in FIG. 1.

As indicated in the drawings, maximum permeability in the typical example exists at about 0.55 part of the insulation, while the core loss decreases steadily over the range as indicated by the tapering curve B as the amount of insulation is increased. However, for other lots of powder the permeability maximum may occur between 0.5 and about 0.8 part of the insulation depending on process conditions. From a manufacturing standpoint, it is highly desirable to use a smaller amount of insulation (0.5 to 0.9 part) than was heretofore used (1.2 to 1.3 parts) so as to achieve a permeability as near as possible to the maximum, to the extent that this can be accomplished with an acceptable core loss. As indicated in FIG. 2, curve B, the core loss is far too high when it is attempted to utilize only 0.5 to 0.9 part of the insulation by the standard method. However, because the aluminate treatment depresses the core loss curve as indicated by curve C, it is possible to utilize more lightly insulated powder so as to achieve a higher permeability, while maintaining the core loss within the manufacturing limit of 0.24 unit.

While the exact mechanism by which the aluminate treatment enhances the properties of the cores is not fully understood, it is believed that the aluminate solution penetrates through microscopic pores in the surface of the pressed core to impregnate the core. The sodium aluminate then reacts with the sodium silicate in the insulation to form a gel which better insulates the particles and fills any minute voids that may exist in the mass. When the core is later fired, the water is driven off and there remains as a constituent of the insulation the heat treated reaction product of the sodium silicate and the sodium aluminate.

Example I

According to one specific example, several core rings produced according to the commercial process described hereinabove were taken as a sample. These core rings were insulated with 1.25 parts by weight of the insulation as previously described. Without any intermediate treatment, a first group of core rings was pressed from this powder at a pressure of about 160,000 pounds per square inch, and the cores were fired in a hydrogen-containing atmosphere at a temperature of 1200° F. The average permeability of these core rings was 125 and the average core loss was 0.190 unit.

A second group of cores was produced from the same powder by exactly the same process, except that these cores were soaked in a 10% aqueous solution of sodium aluminate at about 210° F. for 60 minutes after the compression step and before the firing step. These cores exhibited an average permeability of 121 (a 3.2% decrease) and an average core loss of 0.160 unit, a decrease of 0.03 unit or 15.8%. While this example demonstrates the applicability of the process to standard methods, the principal advantage thereof will be indicated in the following examples as allowing the use of a lighter coating of insulation.

Example II

In the second example, a number of cores were produced with and without the aluminate dip as described in Example I, except that the magnetic particles were insulated with only 0.9 part by weight of the insulation. The untreated cores had an average permeability of 177 and a core loss of 0.60 unit (curve B), which is well beyond the manufacturing standard of 0.24 unit. However, the treated cores exhibited a permeability of 174 and a core loss of only 0.19 unit (curve C), which is within the manufacturing standard. Thus, the core loss was decreased by 0.41 unit or 68% by treatment in accordance with the invention, while a relatively high permeability was achieved.

OIL TREATMENT

According to the second embodiment of the invention disclosed in the parent Patent 3,014,825, magnetic particles containing an insulating coating including an alkali metal silicate, and particularly particles formed generally in accordance with the prior process described hereinbefore, are treated with oil vapor prior to the compression step. Preferably, the insulated particles are coated with a thin film of oil, and are then heated to vaporize at least a portion of the oil. The oil vapor is absorbed by and reacts with the alkali metal silicate to become a constituent of the insulation. With this additional step, the permeability of the finished core may be substantially increased by using higher pressures than were heretofore practical and the core loss is substantially decreased in any case.

Preferably, between 0.05 and 0.35 part by weight, based on 100 parts by weight of the insulated powder, of a light mineral oil is added by mixing the particles with a dilute solution of the oil in a volatile solvent therefor. The dilute solution is used so that the small amount of oil used, preferably about 0.2 part by weight, is extended to cover substantially all of the insulated particles with an exceedingly thin film of oil. This film of oil may have a thickness of approximately 0.001 mil. The dilute solution of oil may range between about 1 and about 3.5% oil, with the remainder being solvent. It is also preferred to add a surface-active agent, such as "Aerosol" (dihexylsodiumsulfosuccinate) or "Levapon," to the oil-solvent mixture so as to lower the surface tension thereof and facilitate coating of the particles with a thin film of oil. Approximately 4 drops of "Aerosol" are sufficient to use with 400 milliliters of the oil-solvent solution.

While the vapors of substantially all oils are absorbed by sodium silicate and may be utilized, one highly suitable oil is a nonblended unreclaimed straight run oil (a light mineral oil) having the following properties: specific gravity, 0.887; viscosity at 100° F. (S.S.U.), 100–135; flash point 310° F.; boiling point, 250° F.; volatile matter 0.35% maximum at 212° F.; neutralization No., 0.10 milligram of KOH to neutralize 1 gram of oil; and ash, 0.01% maximum.

The particular solvent is not critical; however, the solvent must be capable of dissolving the required amount of the oil, up to about 3.5%, and must be vaporized at a temperature substantially below that where the oil begins to vaporize. Acetone, which has a low viscosity and vaporizes at about 134° F., is suitable for application with a wide variety of oils. Other suitable solvents include methyl chloroform, carbon tetrachloride and toluol.

The amount of oil used is dependent on the amount of sodium silicate in the insulation, and the more heavily insulated particles are capable of absorbing a larger amount of oil since more sodium silicate is present.

The oil-coated particles should be heated to a temperature at which the oil begins to vaporize, preferably to about 260° F. for the specific oil described which boils at about 250° F. This temperature should be maintained for a sufficient time, preferably about 5 to 15 minutes, to vaporize a substantial portion of the oil, at least a portion of the oil vapor being absorbed by the sodium silicate. When the core is later fired, any remaining oil is vaporized and the heat-treated reaction product of the sodium silicate and the oil vapor remains as a constituent of the insulation.

A representation of the permeability increase achieved by the oil treatment combined with an increased pressure is indicated by curve D, FIG. 1, while an indication of the decrease in core loss is given in curve E, FIG. 2. It will be appreciated that the oil treatment permits the production of high permeability cores (up to about 240 to 250) for two reasons: first, this treatment permits the use of a higher pressure than was heretofore possible, which results in a denser core having a higher permeability; and second, by drastically reducing the core loss as indicated by curve E in FIG. 2, the method allows the use of a smaller amount of insulation, between about 0.5 and 1.0 part by weight, to take advantage of the phenomenon of maximum permeability.

*Example III*

In this example, a number of cores was produced wherein the particles were insulated with 0.9 part by weight of the insulation as described in Example II. A series of cores produced with 0.9 part insulation by the standard methods, without the oil treatment and at a pressure of about 160,000 pounds per square inch, had an average permeability of 177 (curve A) and a core loss of 0.60 unit (curve B), which is well above the manufacturing standard of 0.24 unit. When it is attempted to produce cores by standard methods at pressures above about 170,000 pounds per square inch, the film of insulation tends to be broken down and the result is an excessive core loss.

A second group of cores was made from the same powder in the same manner, except that the pressure was approximately 200,000 pounds per square inch and the insulated particles were coated with a 2.5% solution of the light mineral oil described hereinbefore dissolved in acetone and containing a minor amount of "Aerosol." Approximately 8 milliliters of the solution were used for 100 grams of the insulated powder, sufficient to yield 0.2 part by weight of the oil per 100 parts by weight of the insulated powder. The oil-containing mixture was then heated to a temperature of 260° F. for about 10 minutes to drive off the solvent and vaporize a substantial portion of the oil. These oil-coated particles were then compressed into cores and fired according to the standard procedure. The cores thus formed exhibit an average permeability of 217 (curve D) and an average core loss of 0.150 unit (curve E), which is well within the manufacturing limit. Thus, by the improved treatment, the permeability was raised 40 units or 22.6%, while the core loss was lowered 0.45 unit or 75%.

*Example IV*

In this example, a series of cores was produced as described in Example III, except that only 0.7 part by weight of the insulation was utilized. This percentage of insulation is designed to achieve a near maximum permeability, as indicated in FIG. 1 (curve D). Without the oil treatment, these cores had a permeability of 210 (curve A) and a core loss of 1.05 units (curve B). The cores treated with oil, however, showed a permeability of 233 (curve D) and a core loss of only 0.175 unit (curve E).

COMBINED METHOD

According to the third embodiment of the invention disclosed in the parent Patent 3,014,825 the aluminate treatment described hereinbefore is combined with the oil treatment just described to produce further improvements in the physical and magnetic properties of the cores. Cores produced according to the combined method have a permeability about the same as that realized by the oil treatment alone (curve D, FIG. 1), a core loss lower than that produced with either the aluminate treatment or the oil treatment alone (curve F, FIG. 2), and markedly improved physical strength and resistance to breaking.

When these treatments are combined and the cores are fired, a ceramic-type reaction product, constituting the subject matter of the present application, is formed between the sodium silicate, the oil vapor absorbed thereby, and the sodium aluminate. This reaction product becomes an important constituent of the insulation, and apparently contributes greatly to the improved physical strength of the cores.

*Example V*

A number of the cores containing 0.9 part by weight of insulation were given an oil treatment as described in Example III and were also given an aluminate treatment as described in Example II. The cores treated according to this combined process has a permeability of 215 and a core loss of 0.115 unit, as compared with 217 and 0.150 for the oil treatment alone, 174 and 0.19 for the aluminate treatment alone, and 177 and 0.60 without any of these treatments.

The cores manufactured in accordance with the combined process were substantially harder and more difficult to break than those produced by any of the other methods, probably due to the presence of the ceramic-type constituent in the insulation. When it was attempted to scratch a broken cross section of a core produced in accordance with the combined method with a sample of Permalloy metal, the insulated particles did not crumble; instead, the metal rubbed off on the surface of the insulated particles. However, when a similar test was applied to cores made by the prior process or those made with the aluminate or oil treatments alone, the powder crumbled in response to scratching by metallic Permalloy. In addition, the cores produced by the combined process were much more difficult to fracture than any of the other cores.

*Example VI*

A number of cores was produced as described in Example IV with 0.7 part by weight of the insulation, except that the sodium aluminate treatment as in Example II was added to the oil treatment. These cores displayed a permeability of 228 and a core loss of 0.125 unit, as compared to a permeability of 233 and a core loss of 0.175 resultant with the oil treatment alone. These cores were also substantially harder and more resistant to breakage than the cores treated with oil alone.

As described in another copending application Serial No. 857,104, filed December 3, 1959, which issued on March 28, 1961 as Patent 2,977,263, all of the core rings formed in accordance with the present invention may be soaked in water after the firing operation and then refired in a hydrogen atmosphere at about 1200° F. so as to increase the permeability by about 20 additional units without any substantial change in the core loss.

While various specific examples of the invention have been described in detail hereinabove, it will be obvious that various modifications may be made from the specific details described without departing from the spirit and scope of the invention.

What is claimed is:

1. A new ceramic material obtained by firing to a temperature in the range of 1000° F. to 1300° F. a mixture consisting essentially of talc, one part by weight, sodium silicate, 0.3 to 0.4 part by weight, and magnesium hydroxide, 0.06 to 0.08 part by weight, said talc, sodium silicate and magnesium hydroxide being pretreated so as to have absorbed therein 0.05 to 0.35 part by weight of a light mineral oil and so as to also have therein a quantity of sodium aluminate absorbed by immersing the mixture in a 5 to 10% aqueous solution of sodium aluminate for a period of 10 to 60 minutes while maintaining the aqueous solution of sodium aluminate at a temperature of 210° F.

2. A new ceramic material obtained by firing to a temperature in the range of 1000° F. to 1300° F. a mixture comprising sodium silicate one part by weight, said sodium silicate being pretreated so as to have absorbed therein 0.14 to 1.0 part by weight of a light mineral oil and so as to have therein a quantity of sodium aluminate absorbed by immersing the sodium silicate in a 5 to 10% aqueous solution of sodium aluminate for a period of 10 to 60 minutes while maintaining the aqueous solution of sodium aluminate at a temperature of 210° F.

References Cited in the file of this patent

Phase Diagrams for Ceramists, The American Ceramic Society, Inc., 1956, pages 96 and 97.